Figure 2:
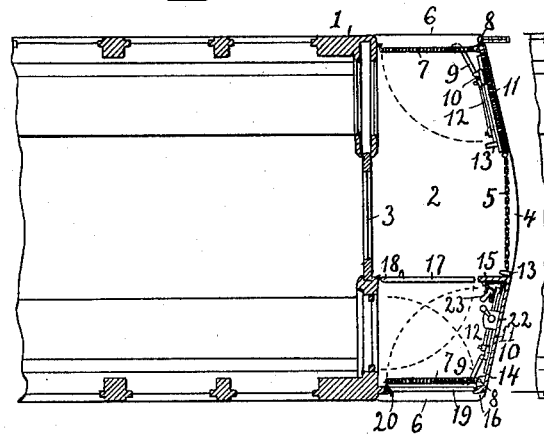

No. 652,049.

F. J. SPRAGUE.
RAILWAY CAR.
(Application filed Dec. 30, 1898.)

Patented June 19, 1900.

(No Model.)

5 Sheets—Sheet 1.

Fig. 1.

Witnesses:
Samuel W. Balch
Patrick F. O'Shaughnessy

Inventor,
Frank J. Sprague
by Thomas Ewing Jr.,
Attorney

No. 652,049. Patented June 19, 1900.
F. J. SPRAGUE.
RAILWAY CAR.
(Application filed Dec. 30, 1898.)
(No Model.) 5 Sheets—Sheet 2.

Witnesses:
Samuel W. Balch
Patrick F. O'Shaughnessy

Inventor,
Frank J. Sprague
By Thomas Ewing, Jr.,
Attorney

THE NORRIS PETERS CO., PHOTO-LITHO., WASHINGTON, D. C.

No. 652,049. Patented June 19, 1900.
F. J. SPRAGUE.
RAILWAY CAR.
(Application filed Dec. 30, 1898.)
(No Model.) 5 Sheets—Sheet 3.
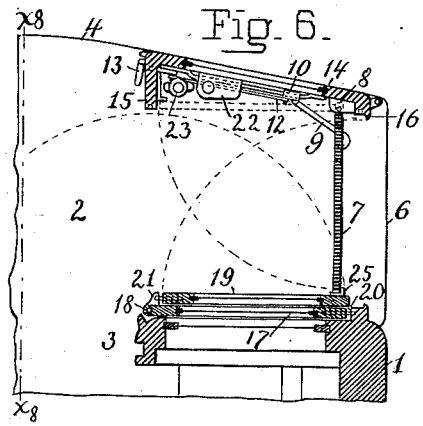
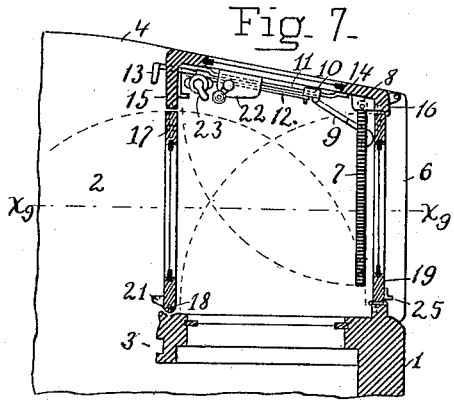
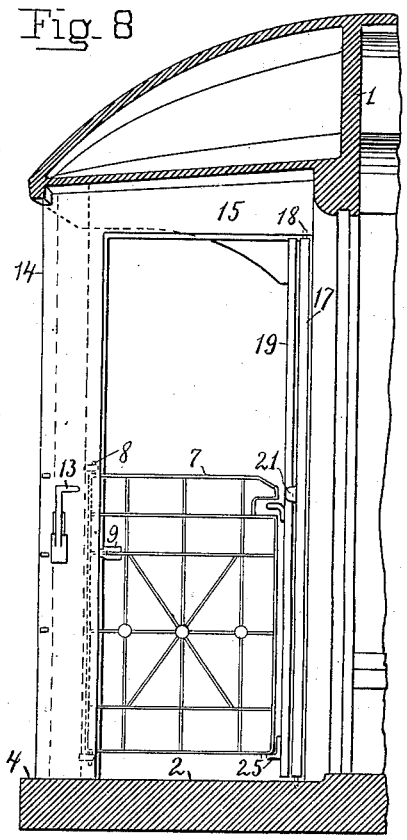
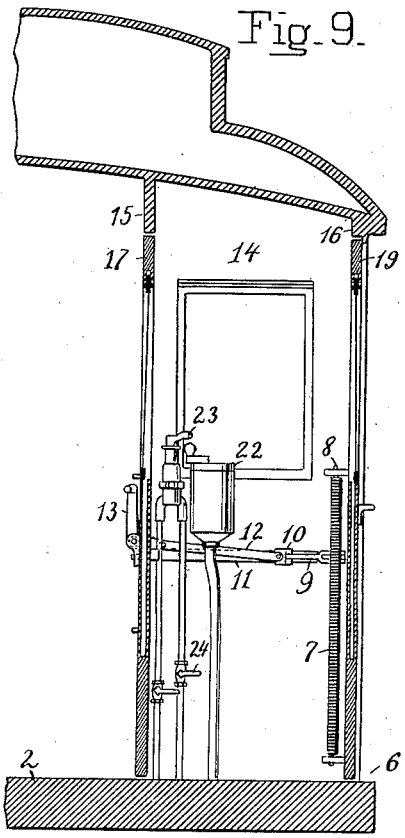
Witnesses:
Samuel W. Balch
Patrick F. O'Shaughnessy
Inventor,
Frank J. Sprague
By Thomas Ewing Jr.,
Attorney No. 652,049. Patented June 19, 1900.
F. J. SPRAGUE.
RAILWAY CAR.
(Application filed Dec. 30, 1898.)
(No Model.) 5 Sheets—Sheet 4.
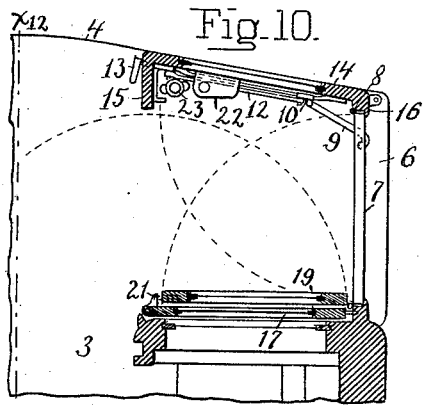
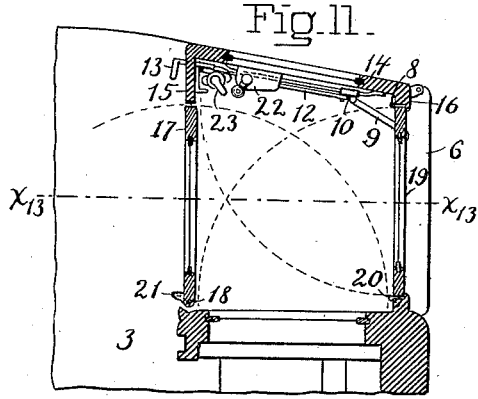
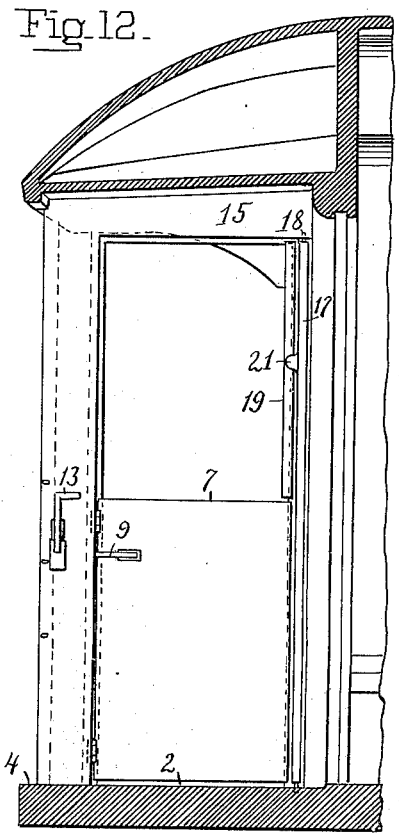
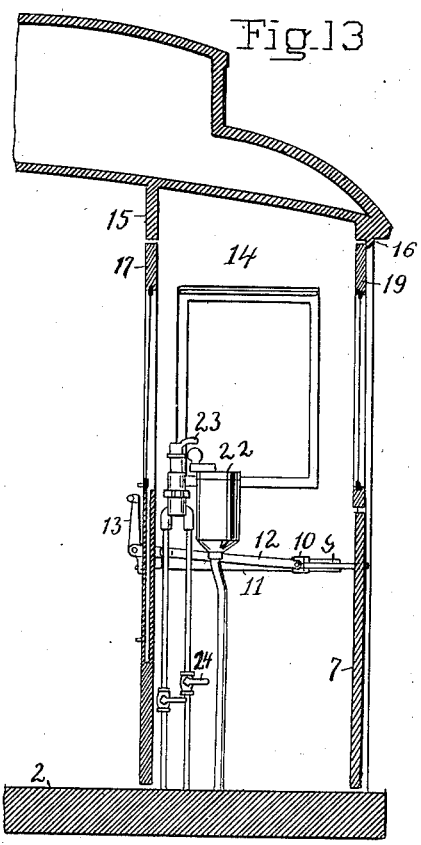
Witnesses:
Samuel W. Balch
Patrick F. O'Shaughnessy
Inventor
Frank J. Sprague
by Thomas Ewing, Jr.
Attorney No. 652,049. Patented June 19, 1900.
F. J. SPRAGUE.
RAILWAY CAR.
(Application filed Dec. 30, 1898.)
(No Model.) 5 Sheets—Sheet 5.
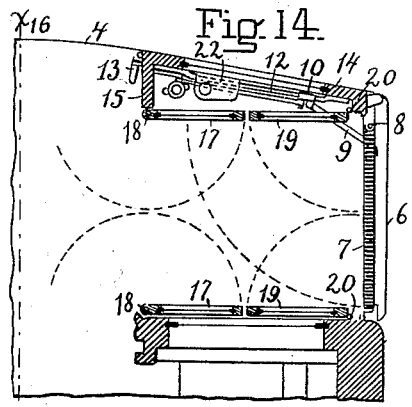
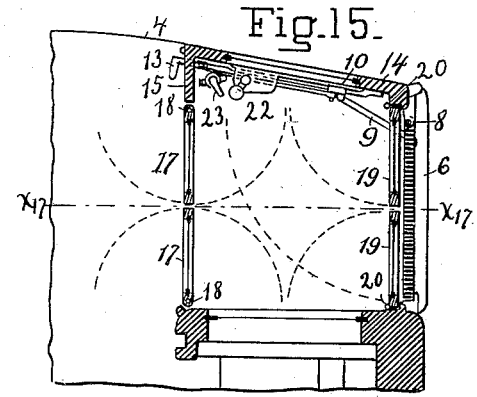
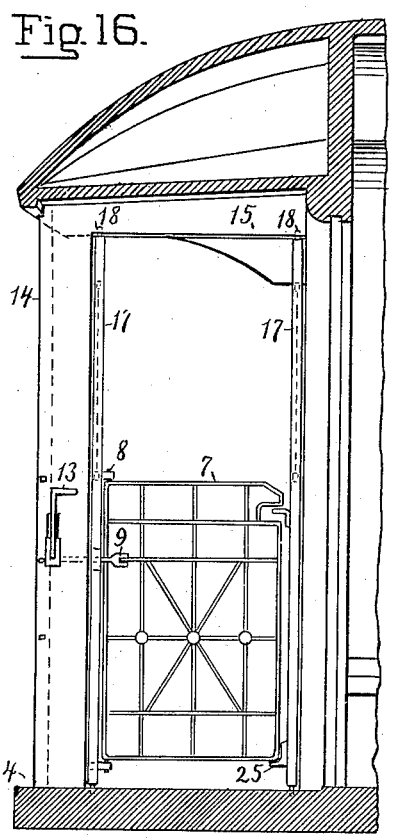
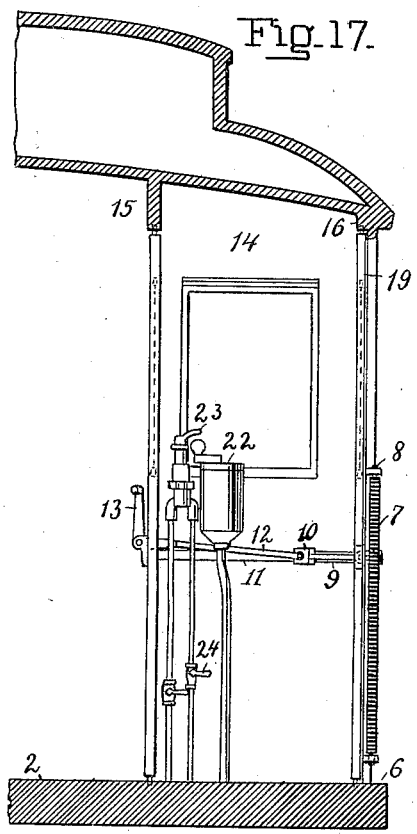
Witnesses:
Samuel W. Balch
Patrick F. O'Shaughnessy
Inventor,
Frank J. Sprague
by Thomas Ewing, Jr.,
Attorney.

UNITED STATES PATENT OFFICE.

FRANK J. SPRAGUE, OF NEW YORK, N. Y., ASSIGNOR TO THE SPRAGUE ELECTRIC COMPANY, OF NEW JERSEY.

RAILWAY-CAR.

SPECIFICATION forming part of Letters Patent No. 652,049, dated June 19, 1900.

Application filed December 30, 1898. Serial No. 700,730. (No model.)

*To all whom it may concern:*

Be it known that I, FRANK J. SPRAGUE, a citizen of the United States of America, and a resident of the borough of Manhattan, in the city of New York, county and State of New York, have invented certain new and useful Improvements in Railway-Cars, of which the following is a specification.

The object of this invention is to provide suitable cabs for cars which are to be run singly with either end foremost or to be connected in a train in any desired order or end relation, no locomotive being employed. According to the position of the car with respect to the train either end of any car may come at the forward end of the train, in which case it must be provided with a suitable cab to contain the train-controlling mechanism and to afford shelter for the motorman, whose duty it is to control the movement of the train, or either end of any car may come at an intermediate position in the train, in which case it must be provided with a suitable platform with an entrance-way or passage from car to car and entrance-ways at the sides to and from the platform. These objects are attained by providing each end of the car with a platform of the usual character, with a passageway at the end of the car across the platform for passage along the length of the train from car to car, and building a cab upon each platform at the side of this end passage-way, so as not to obstruct it, and providing doors in the sides of each of the cabs, which when thrown open afford a transverse passage-way at the side of the car through the cab. The cabs will, as a rule, be built on the right-hand side of each platform—that is, to the right of a person looking from the car-body along the length of the car and across the middle of the platform considered.

Figure 3:
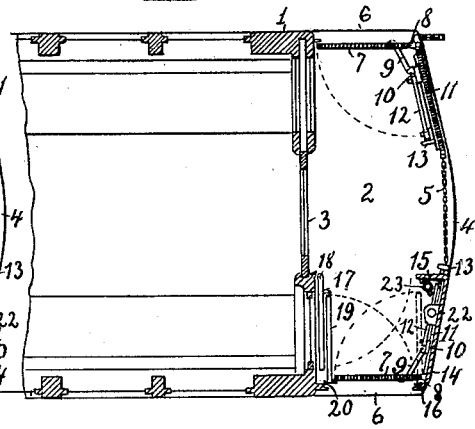
Figure 4:
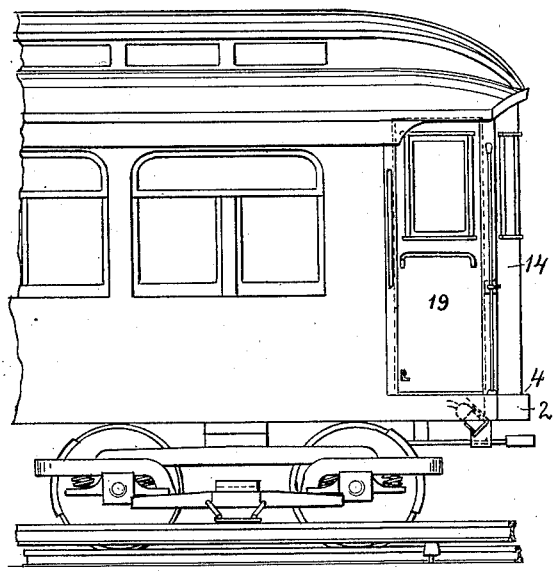
Figure 5:
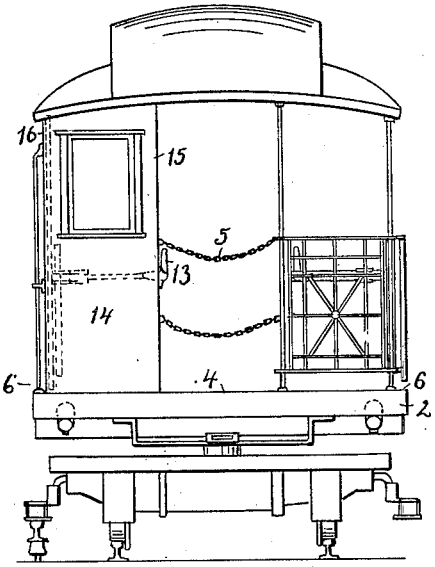

In the accompanying five sheets of drawings, which form a part of this specification, Figure 1 is a plan view of one car and a part of an abutting car constructed according to this invention. Fig. 2 is a plan view of the end of a car, supposed to be at the forward end of a train, with the doors of the cab closed. Fig. 3 is a plan view of the end of a car with the doors of the cab opened and folded against the car-body as they should be when the end of the car is in an intermediate position in the train. Fig. 4 is a side elevation showing one end of a car with the doors of the cab closed. Fig. 5 is an end elevation of the car. Fig. 6 is a plan view showing one corner of a car with the cab, the doors of the cab being open and folded against the car-body. Fig. 7 is a similar plan view showing the cab with the doors closed. Fig. 8 is a vertical section on the line $x^8 x^8$ of Fig. 6, showing the cab with the doors of the cab open. Fig. 9 is a vertical section on the line $x^9 x^9$ of Fig. 7, showing the interior of the cab looking forward, the doors of the cab being closed. Figs. 10, 11, 12, and 13 are views similar to Figs. 6, 7, 8, and 9, showing a modification in which the outer door is divided horizontally, the lower part of the door being hinged at the forward side of the cab, so that it can be used as an ordinary platform-gate. Figs. 14, 15, 16, and 17 are views similar to Figs. 6, 7, 8, and 9, showing a modification in which both the inner and the outer doors are double, one door in each doorway folding to the front and the other door in each doorway folding to the back of the cab.

The car-body 1 and platform 2 are of the usual construction and dimensions. Midway of the car longitudinally are the doorway 3, between the car-body and the platform, and the entrance-way 4, at the end of the platform. This latter entrance-way may be closed by chains 5. The car also has entrance-ways 6 at the sides of the platform. These are guarded by gates 7. Each gate is swung on hinges 8, adjoining an outer corner of the platform, and swings inwardly across the platform. It is provided with opening and closing mechanism consisting of a link 9, connecting the gate with a slide 10, which travels on a horizontal rail 11, and a toggle-link 12, which connects the slide with a bell-crank lever 13.

On the platform at the side of the doorway 3 and entrance-way 4 is the cab or inclosure for the motorman and the control apparatus by which he starts, regulates the speed and direction, and stops the train. The front 14 of the cab is a framing even with the front edge of the platform. The inner side 15 of the cab is even with a side of the car-doorway 3 and of the entrance-way 4, and the outer side 16 of the cab is at an entrance-way 6 through the platform, and the back of cab is the header of the car. The cab is of trapezoidal form, the front being oblique with respect to the back and sides and the "inner" side, by which is meant the side adjoining the end entrance-way, being wider than the opposite or other side. There is a door 17 in the inner side of the cab, called the "inner" door of the cab, which is carried at the top and bottom of one edge on pivots 18, so that it can swing across the doorway of the cab, which it closes, in either direction for convenience of the motorman and so that it can be made somewhat wider than if hinged in the usual way and yet clear the opposite side of the cab when swung into the cab. The pivots are at the corner of the cab, so that the door can be brought flat against the header of the car-body. In the outer side of the cab is a door 19, called the "outer" door of the cab, which is hinged at 20. This hinge is set out from the car-body an amount equal to the thickness of the inner door of the cab, so that when the inner door is swung into the cab against the car-body the outer door can be swung in front of it. Thus the transverse passage-way through the cab, which is afforded when the doors are both swung open, will be cut down by them the least possible. There is a projection 21 on the side of the inner door which is engaged by the latch on the outer door when both doors are open and the outer door is swung in front of the inner door. One or both doors may also be thrown open when the cab is occupied by the motorman and complete shelter from the weather is not needed. To secure the largest exit, the doorway in the outer side of the cab is carried forward as far as possible and the doorway in the inner side is carried as far forward as that in the outer side. The front of the cab and the side doors are provided with windows and pockets below the windows into which the windows can be let down.

The cab being of a trapezoidal form, there is a triangular space in front of the passage-way, in which are located the devices for controlling the train. The drawings show for this purpose an electric switch 22, by means of which the motors on the cars are electrically controlled, and an air-valve 23 for controlling the brake mechanism. The handles by which these devices are operated are removed when the cab is to be used as a passage-way to and from the car. Stop-cocks 24 are inserted in the pipes leading from the air-valve, and these are turned off when the valve is not in use.

Owing to the frequency with which the entrance-way at the side has to be opened and closed when used as a passage-way for passengers, it is preferable to provide the usual light iron gate 7, together with its opening and closing mechanism, and have the door open. Some modifications in the location of the gate-hinges and in the lengths of the toggle-link 12 and the bell-crank lever 13 are necessary to adapt them to the cab. The handle of the bell-crank lever is placed outside the cab, so that it can be operated by the guard while standing at the meeting ends of two cars. One arm of the lever passes through an opening in the inner side of the cab, and through the toggle-link, slide 10, and link 9 operates the gate. When the gate is open, it lies in front of the triangular space in which the train-controlling apparatus is located and protects the apparatus while the passage-way is being used. The rail 11, on which runs the slide 10 of the mechanism for opening and closing the gate, lies along the front, inside of the cab, and is bent at one end to make a stop for the gate when open. Gate-stops 25 are attached to the outside of the outer door and serve as stops for the gate when the door is swung into the cab and the gate is closed.

With the above-described arrangement the lower portion of the entrance is guarded by both the door of the cab and the gate. This duplication may be dispensed with, as shown in Figs. 10 to 13, by having the door 19, which folds against the back of the cab, only extend down to the top of the gate 7 and fitting the gate into the lower part of the doorway and making it solid instead of open metal-work, thus making it a half-door, so that with the half-door in the upper portion it will close the passage-way against the weather. The door and gate or the two half-doors, although occupying the same doorway, are hinged to opposite sides, and the latter is controlled through opening and closing mechanism, as already described.

In another modification, a vertically-divided double door composed of two half-doors oppositely hinged is set in each doorway of the cab, one of the half-doors in each doorway folding against the front of the cab or part occupied by the train-controlling apparatus, which they will protect, and the other half-door in each doorway closing against the header of the car. In this form a separate gate outside the outer doors can be used, or the vertically-divided door may be carried down to the top of the gate only and the gate made solid, as shown in Figs. 10 to 13. Both of the inner double doors are hinged on pivots and swing in both directions for the convenience of the motorman.

The car is similarly constructed at both ends, the cabs being at diagonally-opposite corners, so that either end can be made the front end of a train with the control apparatus preferably on the right side of the car.

Modifications may be made without departing from the spirit of the invention—as, for example, in the use of doors for the cab which open in other ways than those shown.

What I claim, and desire to secure by Letters Patent of the United States, is—

1. A car provided with a cab formed at the back by the header of the car, at the front by a framing at the edge of the platform, and at each of its sides by doors swinging into the cab for affording a passage-way at the side of the car, one of the side doors being between the other side door and the doorway between the car-body and the platform, substantially as described.

2. A car provided with a passage-way at the end of the car, a cab at one side of this end passage-way, and doors at the sides of the cab for affording a passage-way at the side of the car through the cab, substantially as described.

3. A car provided with a passage-way at the end of the car, a cab at one side of this end passage-way, and a door at the inner side of the cab hinged to swing either into or away from the cab, substantially as described.

4. A car provided with a passage-way at the end of the car, a cab at one side of this end passage-way, a door at the inner side of the cab hinged to swing either into or away from the cab, and a door at the outer side of the cab hinged to swing into the cab for affording a passage-way at the side of the car, substantially as described.

5. A car provided with a passage-way at the end of the car, a cab at one side of this end passage-way, a door at the inner side of the cab hinged to swing into the cab, and two doors oppositely hinged at the outer side of the cab to swing into the cab for affording a passage-way at the side of the car, substantially as described.

6. A car provided with a cab, and doors in the opposite sides of the cab hinged to swing one in front of the other against the back of the cab, for affording a passage-way at the side of the car, substantially as described.

7. A car provided with a car-body and an end platform, a passage-way at the end of the car, a cab on the platform at one side of this end passage-way, and doors in each of the sides of the cab for affording a passage-way at the side of the car, substantially as described.

8. A car provided with a car-body and an end platform, a passage-way at the end of the car, a cab on the platform at one side of this end passage-way, and doors in the sides of the cab hinged to swing into the cab and against the back thereof, substantially as described.

9. A car provided with a car-body and an end platform, a passage-way at the end of the car, a cab on the platform at one side of this end passage-way, doors in the sides of the cab hinged to swing into the cab and against the back thereof, and a gate which swings into the cab and toward the front thereof, substantially as described.

10. A car having at each end a passage-way, a cab at one side of each of the end passage-ways, the cab being at diagonal corners of the car, and doors in each of the sides of the cab for affording a passage-way at the side of the car through the cab, substantially as described.

Signed by me in New York city, New York, this 29th day of December, 1898.

FRANK J. SPRAGUE.

Witnesses:
CHARLES M. SPRAGUE,
J. ENGLISH.